United States Patent
Bruemmer et al.

(10) Patent No.: US 9,731,417 B2
(45) Date of Patent: Aug. 15, 2017

(54) VEHICLE MANAGEMENT SYSTEM

(71) Applicant: 5D Robotics, Inc., Carlsbad, CA (US)

(72) Inventors: David J. Bruemmer, Carlsbad, CA (US); R. Scott Hartley, Idaho Falls, ID (US)

(73) Assignee: 5D Robotics, Inc., Carlsbad, CA (US)

( * ) Notice: Subject to any disclaimer, the term of this patent is extended or adjusted under 35 U.S.C. 154(b) by 0 days.

(21) Appl. No.: 14/717,688

(22) Filed: May 20, 2015

(65) Prior Publication Data

US 2015/0285646 A1 Oct. 8, 2015

Related U.S. Application Data

(63) Continuation of application No. 13/597,911, filed on Aug. 29, 2012, now Pat. No. 9,053,394.
(Continued)

(51) Int. Cl.
| | |
|---|---|
| *B25J 9/16* | (2006.01) |
| *G06K 9/00* | (2006.01) |
| *G06K 9/62* | (2006.01) |
| *B25J 9/08* | (2006.01) |
| *G06F 3/01* | (2006.01) |

(Continued)

(52) U.S. Cl.
CPC ........... *B25J 9/1602* (2013.01); *B25J 9/08* (2013.01); *B25J 9/161* (2013.01); *B25J 9/1633* (2013.01); *B25J 9/1666* (2013.01); *B25J 9/1684* (2013.01); *B25J 9/1694* (2013.01); *B25J 9/1697* (2013.01); *G01C 21/34* (2013.01); *G06F 3/016* (2013.01); *G06K 9/00791* (2013.01); *G06K 9/6293* (2013.01); *G06T 11/206* (2013.01);
(Continued)

(58) Field of Classification Search
CPC ... G06K 9/00791; B60L 15/2045; B60Q 1/26; G06Q 10/04; G06Q 30/04; G01C 21/3469
USPC .......................................... 701/36, 123, 522
See application file for complete search history.

(56) References Cited

U.S. PATENT DOCUMENTS

| | | | |
|---|---|---|---|
| 4,980,626 | A | 12/1990 | Hess et al. |
| 5,655,148 | A | 8/1997 | Richman et al. |

(Continued)

FOREIGN PATENT DOCUMENTS

| | | | |
|---|---|---|---|
| EP | 1702365 A1 | 1/2001 | |
| EP | 2036777 A1 | 3/2009 | |

(Continued)

OTHER PUBLICATIONS

Brooks, Rodney A; Planning is Just a Way of Avoiding Figuring Out What to Do Next; MIT 1987.

(Continued)

*Primary Examiner* — Yuri Kan
(74) *Attorney, Agent, or Firm* — Martensen IP

(57) ABSTRACT

A system and method to identify optimal vehicular movement based on reactive and deliberative components is described. Modifiable use conditions, such as speeding, excessive idling, gear selection, acceleration and deceleration profiles, as well as optimal path determination and follow distance are identified and optimized based on a reactive interaction between the vehicles and infrastructure on a real-time basis. Using active positioning tags placed within the environment and/or attached to each vehicle a vehicle's position can be determined relative to other proximal vehicles or relative to its environment. With such information a vehicle's path can be optimized.

11 Claims, 5 Drawing Sheets

Related U.S. Application Data

(60) Provisional application No. 61/529,206, filed on Aug. 30, 2011.

(51) Int. Cl.
    *G06T 11/20* (2006.01)
    *G01C 21/34* (2006.01)
    *G08G 1/00* (2006.01)

(52) U.S. Cl.
    CPC .............. *G08G 1/22* (2013.01); *Y10S 901/09* (2013.01); *Y10S 901/10* (2013.01)

(56) References Cited

U.S. PATENT DOCUMENTS

| | | |
|---|---|---|
| 5,748,980 A | 5/1998 | Lipe et al. |
| 5,889,926 A | 3/1999 | Bourne et al. |
| 5,999,989 A | 12/1999 | Patel |
| 6,092,021 A | 7/2000 | Ehlbeck et al. |
| 6,216,631 B1 | 4/2001 | Wissner-Gross |
| 6,708,068 B1 | 3/2004 | Sakaue |
| 6,889,118 B2 | 5/2005 | Murray, IV et al. |
| 7,211,980 B1 | 5/2007 | Bruemmer et al. |
| RE39,907 E | 11/2007 | Hong |
| 7,584,020 B2 | 9/2009 | Bruemmer et al. |
| 7,587,260 B2 | 9/2009 | Bruemmer et al. |
| 7,620,477 B2 | 11/2009 | Bruemmer |
| 7,668,621 B2 | 2/2010 | Bruemmer |
| 7,778,769 B2 | 8/2010 | Boss et al. |
| 7,801,644 B2 | 9/2010 | Bruemmer et al. |
| 7,877,198 B2 | 1/2011 | Tenzer et al. |
| 7,974,738 B2 | 7/2011 | Bruemmer et al. |
| 8,073,564 B2 | 12/2011 | Bruemmer et al. |
| 8,112,203 B2 | 2/2012 | Shin et al. |
| 8,155,868 B1 | 4/2012 | Xing et al. |
| 8,190,319 B2 | 5/2012 | Syed et al. |
| 2006/0074525 A1 | 4/2006 | Close et al. |
| 2006/0117324 A1 | 6/2006 | Alsafadi et al. |
| 2007/0174004 A1* | 7/2007 | Tenzer ............... G06Q 10/04 701/123 |
| 2007/0206849 A1 | 9/2007 | Sakata et al. |
| 2010/0076878 A1* | 3/2010 | Burr ................ G06Q 30/04 705/34 |
| 2010/0332113 A1* | 12/2010 | Tengler ............ G01C 21/3469 701/123 |
| 2011/0060495 A1 | 3/2011 | Kono et al. |
| 2011/0066324 A1* | 3/2011 | Odland .................. B60Q 1/26 701/36 |
| 2011/0208399 A1 | 8/2011 | Fekete et al. |
| 2011/0313647 A1* | 12/2011 | Koebler ............ B60L 15/2045 701/123 |

FOREIGN PATENT DOCUMENTS

| | | |
|---|---|---|
| WO | 2009070069 A1 | 6/2009 |
| WO | 2010011806 A1 | 1/2010 |
| WO | 2010028626 A1 | 3/2010 |
| WO | 2010134824 A1 | 11/2010 |
| WO | 2012/061932 A1 | 5/2012 |

OTHER PUBLICATIONS

Hester, Todd, et al.; RTMBA: A Real-Time Model-Based Reinforcement Learning Architecture for Robot Control; Dept. of Computer Science, UT Austin; IEEE International Conference on Robotics and Automation; St. Paul, MN, USA May 2012.

Alur, R., et al.; A Framework and Architecture for Multirobot Coordination; GRASP Lab and SDRL Lab, University of Pennsylvania, Philadelphia, USA.

Ferrell, Cynthia; Robust Agent Control of an Autonomous Robot with Many Sensors and Actuators; MIT.

Fierro, Rafael, et al.; A Framework and Architecture for Multi-Robot Coordination; International Journal of Robotics Research 2002 21:977.

Kuipers, Benjamin, et al.; A Robot Exploration and Mapping Strategy Based on a Semantic Hierarchy of Spatial Representations; UT Austin; 8279 Robotics and Autonomous Systems 8 Nov. 1991, No. 1/2, Amsterdam, NL.

Bannach, David, et al.; Distributed Modular Toolbox for Multi-Modal Context Recognition; 1—UMIT, Hall in Tyrol, Austria; 2—Wearable Computing Lab, ETH Zurich, Switzerland.

Collins, Robert T., et al.; Algorithms for Cooperative Multisensor Surveillance; pProceedings of the IEEE vol. 89, No. 10, Oct. 2001.

Fardi, Basel, et al.; Shape and Motion-Based Pedestrian Detection in Infared Images: A Multi Sensor Approach; Chemnitz University of Technology, Chemnitz, Germany; 2005 IEEE.

Kanade, Takeo, et al.; Advances in Cooperative Multi-Sensor Video Surveillance; Robotics Institute, Carnegie Mellon University, Pittsburgh, PA.

International Search Report and Written Opinion of the International Searching Authority; Apr. 29, 2013; PCT/US2012/053056.

International Search Report and Written Opinion of the International Searching Authority; Apr. 24, 2012; PCT/US2012/053070.

International Search Report and Written Opinion of the International Searching Authority; May 24, 2013; PCT/US2012/053077.

International Search Report and Written Opinion of the International Searching Authority; Jan. 22, 2013; PCT/US2012/053066.

\* cited by examiner

VEHICLE MANAGEMENT SYSTEM

RELATED APPLICATION

The present application is a continuation of U.S. patent application Ser. No. 13/597,911 filed 29 Aug. 2012 and claims the benefit of priority to U.S. Provisional Patent Application No. 61/529,206 filed Aug. 30, 2011, both of which are hereby incorporated by reference in their entirety for all purposes as if fully set forth herein. The present application if further related to the following commonly assigned patent applications: U.S. patent application Ser. No. 13/597,791 entitled, "Asynchronous Data Stream Framework", U.S. patent application Ser. No. 13/597,991 entitled, "Modular Robotic Manipulation", U.S. patent application Ser. No. 13/598,021 entitled, "Graphical Rendition of Multi-Modal Data, and U.S. patent application Ser. No. 13/598,144 entitled, "Universal Payload Abstraction, all of which filed on Aug. 29, 2012.

BACKGROUND OF THE INVENTION

Field of the Invention

Embodiments of the present invention relate, in general, to vehicular management systems, and more particularly, to systems and related methodology for improved fuel efficiency based on inter-vehicle, and vehicle-to-infrastructure communication.

Relevant Background

Modern vehicles are typically equipped with one or more computer systems. These systems often provide, among other things, information relating to the vehicle's fuel economy. There are many different versions of these types of devices but generally, each of them provide information with respect to the vehicle's current or historical fuel efficiency. For example, one display may provide and "instantaneous" miles per gallon while another may provide "average" miles per gallon over a specified trip or time frame. Most models of vehicles on the road today can provide this type of information to users with reasonable accuracy. Little information, however, is provided to give the user an indication of what steps can be taken to improve fuel efficiency.

Similarly, navigation systems that are either integrated into a vehicle or added as after market products are widely available that can provide detailed directions regarding a quickest route to a destination or a route that avoids toll roads, ferries or even traffic delays. However, current systems however do not offer a user with route guidance as to how to modify their route to increase fuel efficiency. Moreover, little or no information is provided as how to modify the control of a vehicle to optimize fuel efficiency. For example, it is widely accepted that vehicles consume less fuel at slower speeds.

One basis for that assumption is that as vehicle speed increases, the resistance induced from moving through the air (drag) increases just as is experienced with an aircraft. Such a statement is substantially true in controlled conditions, however, real world driving does not occur in a controlled environment. In reality, better fuel efficiency may be achieved by maintaining a higher speed on one segment of a road and a lower speed on another segment due to several competing factors. For example, if we assume at least one factor for determining fuel efficiency is drag experienced by the vehicle due to wind resistance, then to increase fuel efficiency when traveling with a tail wind, one should speed up. These and other considerations and deficiencies of the prior art are addressed by one or more embodiment of the present invention.

SUMMARY OF THE INVENTION

A system for managing the consumption of fuel can, according to one embodiment of the present invention, include a reactive module and a deliberative module. The reactive module is operable to determine a real-time vehicle speed for optimal fuel efficiency while the deliberative module can determine a vehicle speed for optimal fuel efficiency for a particular location based on historical data. A behavior module interposed between and communicatively coupled to the reactive module and the deliberative module combines the reactive vehicle speed and the deliberative vehicle speed to arrive at a suggested optimal vehicle speed for fuel efficiency.

A vehicle control system of the present invention collects and analyzes real time and historical vehicular and environmental data to provide behavioral recommendations with respect to optimized fuel consumption. In addition to collecting and analyzing intrinsic data the system can also gather data from other vehicles with respect to their optimal fuel efficiency profiles for the same geographic location. This ancillary data is normalized and used to enhance the intrinsic calculations for behavioral recommendations.

In another embodiment of the present invention a method for managing fuel consumption of a vehicle includes collecting real time vehicular and environmental data, as well as determining a location for the vehicle, to determine a reactive vehicle speed for optimal fuel efficiency. In addition the method accesses historical vehicular performance data for the location of the vehicle to determine a deliberate vehicle speed for optimal fuel efficiency and then merges the reactive vehicular speed and the deliberate vehicle speed to ascertain an optimal vehicle speed for fuel efficiency.

Other aspects of the present invention include such things as the reactive module collecting real time data about a plurality of vehicle and environmental characteristics. These characteristics can include vehicle weight, temperature, tire pressure, road condition, and barometric pressure.

Moreover the deliberative module ideally analyzes and applies historical vehicular performance data of the vehicle for the particular location but can use pre-established non-location specific performance data. The deliberative module can also analyzes and apply historical vehicular performance data of other vehicles at the particular location.

The behavior module of the present invention suggests, in one embodiment, an optimal gear selection and other techniques for fuel efficiency. As mentioned, the system is operable to communicate data among two or more vehicles including the reactive vehicle speed for optimal fuel efficiency and the deliberate vehicle speed for optimal fuel efficiency. By doing so vehicles share historical vehicular performance data for a plurality of particular locations. The behavior module is operable to modulate the reactive vehicle speed based on data received from other vehicles within a predetermined proximity of the vehicle and suggest an optimal vehicle speed for fuel efficiency is based on a collaborative calculation among the other vehicles within the predetermined proximity of the vehicle.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
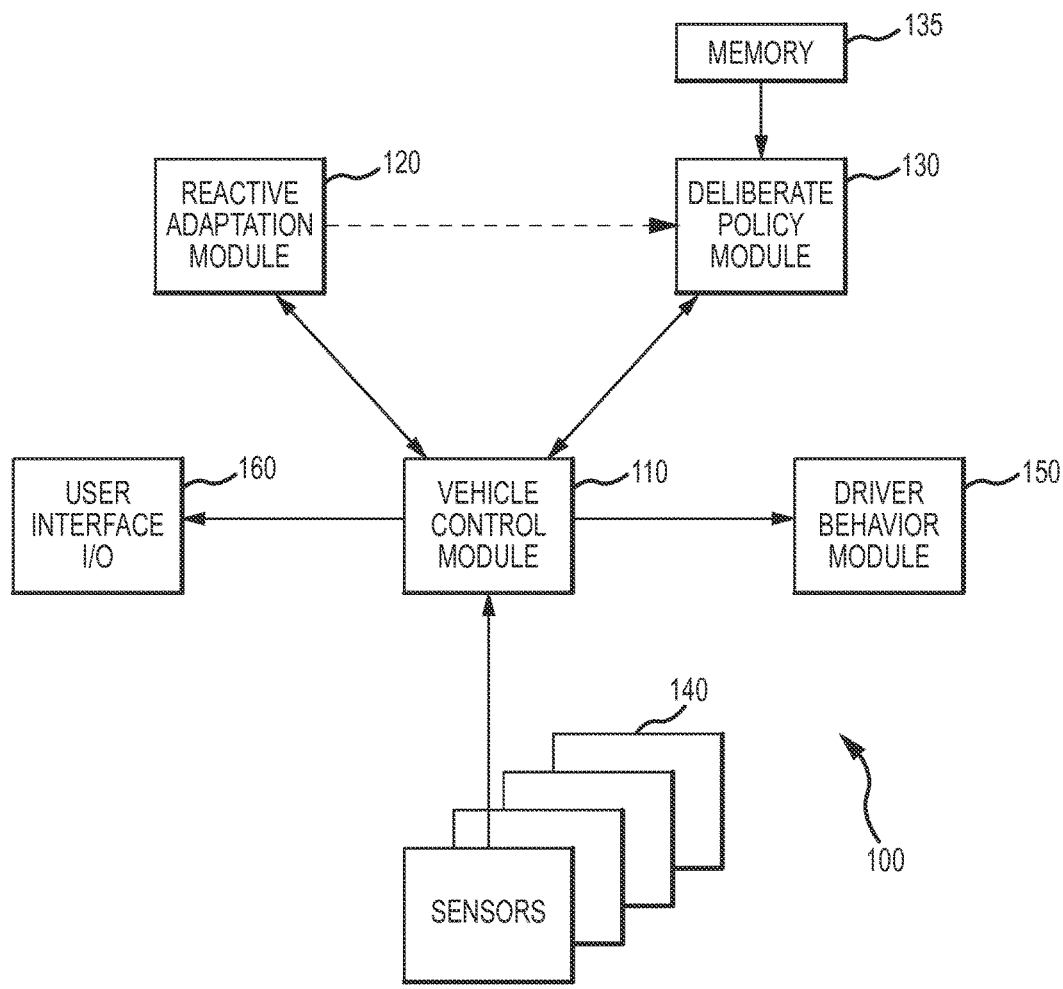
FIG. 1 is a high level block diagram of a system for vehicular management according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A vehicle control module collects and analyzes real time and historical vehicular and environmental data to provide behavioral recommendations with respect to optimized fuel consumption. According to one embodiment of the present invention, a vehicular control module monitors and collects real-time vehicular and environmental data to construct an optimal speed/behavior profile that is reactive to current conditions. As the system determines that the vehicle can be operated in a manner that is more fuel efficient, recommendations on how to do so are presented to the user. Simultaneously, a deliberative fuel consumption profile is constructed based on historical data tied to the current location of the vehicle. The current conditions and user interaction with the vehicle with respect to fuel consumption are compared to historical data with respect to the same location. Using this data a determination can be made whether, based on current conditions, and historical data, a recommendation can be presented to the user as a means by which to modify current operating methodology to optimize fuel consumption.

In one embodiment of the present invention, a deliberative policy module also interacts with other nearby vehicles to gain normalized data pertinent to the determination of optimized fuel efficiency. For example the operation of truck versus a car with respect to optimized fuel efficiency on the same segment of road may be vastly different. But both optimized solutions may be based on one or more common considerations. By sharing universally applicable data, a vehicle that has never traversed a particular segment of highway or traveled that route an insufficient number of times to individually develop meaningful data can benefit from vehicles that have traveled the same segment numerous times. And while some of the data is vehicular specific, other portions of the data can be universally applicable to all vehicles. This universal data is conveyed in an abstract format and used to provide to the user a deliberative optimized fuel consumption profile that when combined with the reactive profile, provides the user with useful behavioral recommendations.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to optimize fuel consumption. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "comprises," "comprising," "includes," "including," "has," "having" or any other variation thereof, as used herein are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for optimizing vehicular fuel consumption through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

As described with reference in addition to FIG. 1, vehicular management system 100 includes a vehicle control module 110 communicatively coupled to a plurality of sensors 140, a reactive adaptation module 120, and a deliberative policy module 130. Taking data collected by the plurality of sensors 140 and the recommendations provided by the reactive adaptation model 120 and the deliberative policy module 130, the vehicular control module 110 works with the driver behavior module 150 to provide user recommendations as to how to operate the vehicle to produce optimal fuel consumption.

According to one embodiment of the present invention the vehicle control module 110 is communicatively coupled to a plurality of sensors 140 that can convey data relating to the global position of the vehicle, native vehicle data such as fuel flow delivered to the engine, operating temperature, oxygenation, barometric pressure with respect to engine operation, tire pressure, gear selection in gear ratio, gross vehicular weight, vehicular configuration (status of windows and/or roof components) and the like. One of reasonable skill in the relevant art will appreciate that any of these factors alone or in combination may significantly affect fuel consumption. For example, having the windows down while driving at highway speed increases drag while operating the vent system may maintain the interior temperature without a incurring a "fuel expense". Additional sensors that are coupled to the vehicular control module 110 can also provide environmental data including air temperature, surface temperature, relative humidity, inclination, road conditions, relative wind speed, and other factors that may affect the performance of the vehicle. Driving on a dirt or gravel road is not as efficient as on a paved surface, just as a snow packed road, while reducing friction, makes the operation of the engine less efficient.

The vehicular control module 110 in conjunction with the reactive adaptation module 120 applies advanced computational intelligence methods to the collected data in real-time to extract valuable information with respect to the vehicle and the environment and, by identifying significant behavioral patterns while removing outliers, constructs a fuzzy model regarding optimize fuel consumption. The reactive adaptation model 120 adjusts the determination of an optimal speed for fuel efficiency based on current conditions and recent data feedback from the vehicular sensors and any user inputs. By contrast the deliberative policy module 130 uses historical data associated with the current route and past user interaction so at to determine historical optimal performance.

For example, assume a sedan equipped with a plurality of sensors and the capability of the invention described herein is traveling along a particular segment of highway. As the sedan travels down the highway, sensors continually collect information with respect to the fuel flow to the engine, the operating temperature of the engine and its characteristic operation, tire pressure, gear ratio and gear selection, the configuration of the vehicle with respect to whether the windows are rolled up or down or in the case of a convertible if the top is up or down, and other native characteristics of the vehicle. Using this information, a real-time consumption of fuel with respect to the distance traveled, a.k.a. miles-per-gallon (mpg), can be calculated and displayed. Just as in many versions of vehicles currently on the road, and is well known in the prior art, a display of the real-time current miles-per-gallon to be presented to the user as an indication of how much fuel is being used.

According to one embodiment of the present invention, the information collected by the vehicle control module 110 is conveyed to the reactive adaptation module 120 which determines whether the current operation of the vehicle optimizes fuel consumption and how minor modifications to user behavior or configuration can improve fuel efficiency. When the sedan is operating at a speed at which fuel consumption can be optimized by either traveling faster or slower, such an indication is presented to the user as an action by which to optimize fuel consumption. For example, perhaps based on the weight of the sedan an increase in the tire pressure by 5 pounds/inch can provide a 5% increase in fuel economy. Further and for the purposes of this example, assume the sedan is traveling on a slightly inclined paved roadway with dry road conditions and a 10 mile an hour headwind. Also assume that there are no legal restrictions to either decreasing or increasing the vehicle speed so as to optimize fuel consumption. One of reasonable skill in the relevant art will recognize that in certain circumstances, achieving an optimal fuel consumption speed profiled may violate governmental regulations or safety parameters.

In this circumstance, the user may typically set the sedan to travel at 50 mph resulting in a fuel economy of 20 miles per gallon. However, in this circumstance with a slightly inclined road and in tailwind a more optimized miles per gallon may be obtained at 55 mph. The increase in speed may be attributed to the decreasing wind resistance due to the tailwind, and a lower than normal gross weight of the vehicle. According to one embodiment of the present invention, a user interface 160 such as a display indicator on the odometer will provide immediate feedback to the user to increase his speed so as to reach optimal fuel consumption or a simply message that indicates to the user that by increasing their speed to 55 mph, if safe and legal to do so, the user may increase fuel economy from 20 miles-per-gallon to 22 miles-per-gallon. One of reasonable skill in the relevant art will appreciate that if the user simply turns the car around and travels over the same segment of road in the opposite direction, the speed at which an optimal fuel consumption occurs will be different than that described above. For example, the tailwind would now be a headwind and the inclination of the highway would now be a declination. Accordingly, the computation of the speed at which to achieve optimal fuel consumption and associated recommendations would likely differ.

Another aspect of the present invention is the incorporation of a deliberative policy with respect to optimal fuel consumption. While the reactive adaptation module 120 provides the user with real-time feedback with respect optimal fuel consumption, the present invention also stores current information with respect to fuel consumption as associated with a particular segment of highway or similar positional data for later analysis and use. The deliberative policy module 130 retrieves historical data from memory 135 regarding fuel consumption and vehicle characteristics to determine behavioral responses which have historically provided optimal fuel consumption and to provide a datum by which to compare the current state so as to arrive at a determination of whether there exists the possibility that fuel efficiency can be improved. Accordingly these historical behavioral responses are merged with the reactive real-time recommendations to provide to the user a much more comprehensive and useful recommendation.

For example, consider the same sedan traveling down a segment of highway which is frequently traveled by the user. The segment of highway is paved, possesses a dry road condition, and has a declination angle of approximately 5°. In a normal situation with calm wind, assume that the optimal speed for this section of highway as determined by the reactive adaptation module would be 55 mph. If the user is currently traveling at 30 mph the reactive adaptation module 120 would display a recommendation to the user to increase his speed to 55 mph. However the deliberative policy module 130, recognizing that the vehicle is on a segment of highway which has been frequently traveled, calculates based on the position of the vehicle that it is highly likely the vehicle will come to stop within the next half mile and a more accurate optimal speed is 45 mph. This conclusion is based on historical data of the sedan traveling on the same segment of highway in the past. For example, perhaps either a stoplight or stop sign normally restricts travel in this particular segment of highway. Alternatively traffic may suggest that a particular time of day the optimal speed of 55 mph is not realistically possible. Regardless of the circumstances that surround the historical data, the deliberative policy module determines that an optimal fuel consumption speed is, for example, more accurately 45 mph for the next 2 miles followed by 50 mph for the next 5 miles. Depending on how robust the data from which the deliberative policy module had made its determination, the vehicular control module merges the recommendations from the reactive adaptation model and the deliberative policy module to arrive at a final recommendation presented to the user. In this case, as the deliberative policy module possesses substantial data identifying the likelihood that the vehicle will stop with the next half mile, the vehicular control module overrides the reactive adaptation module's recommendation and presents to the user a recommendation for optimal fuel consumption more aligned with that produced by the deliberative policy module.

Another aspect of the present invention, and specifically the deliberative policy module operation, is the ability to collect and utilize historical data from other vehicles. Using a wireless transmission capability embedded within the vehicles or a capability added to the vehicle as an aftermarket product, the deliberative policy model of one vehicle can wirelessly communicate and transfer data to a deliberative policy module of another vehicle. According to one embodiment of the present invention, data collected and stored by each vehicle is normalized so as to be applicable to any vehicle. When another vehicle comes within communication range, and communication protocols are exchanged, a communication relationship is established and normalized vehicle performance data for a particular position of interest is transferred. Normalized vehicular data may include information with respect to typical speed profiles for particular time of day (taking into account traffic and other delays which may not be otherwise physically) and for certain segments of highway. For example, an optimal fuel consumption profile for a large truck may indicate that from 4 PM to 6 PM on a certain segment of highway the optimal fuel consumption speed is 30 mph requiring a lower gear ratio and other certain configurations. Although this speed configuration and recommendation may not apply to a sedan, it nonetheless conveys important information with respect to the position and optimal speed determination for a certain period of time. Moreover the truck may indicate that for a particular location a certain gear selection provides an optimal fuel consumption profile. While the gross weight and particular gear selection of the truck is irrelevant to the sedan, a normalized reading of the same data may indicate to the sedan that a lower, sedan specific, gear selection may produce an optimize fuel consumption based on a gross weight analysis of the sedan. That, combined with the reactive adaptation module recommendation, produces a speedy recommendation for optimal fuel consumption.

According to another embodiment of the present invention, the recommendation prompted by fuel consumption is integrated with a behavior model which recognizes individualistic user patterns and produces a fuzzy logic recommendation for optimal fuel consumption. The behavior module recognizes differing user input and, based on historical data and ancillary considerations, produces a fuzzy logic model to simulate typical user patterns that can be adjusted so as to achieve better fuel efficiency.

In other embodiments of the present invention the deliberative policy module, in conjunction with the vehicular control module, can suggest alternative routes to a desired destination that provides optimized fuel consumption. The navigation systems of most vehicles can provide a "fastest route" to destination, the present invention incorporating historical and reactive data, can provide the user with a route to destination that minimizes fuel consumption. Parameters can be set such that a route that suggests minimal fuel consumption is limited to delay arrival by no more than a predetermined period of time and that any route that delayed arrival beyond that delay be rejected. In another embodiment the system and be set to default to a route that offers optimal fuel consumption but minimally affects arrival time. The result may, for example, be that the route suggested is less hilly, less congested, or with fewer traffic controls, so as to provide the vehicle with the best opportunity to maximize fuel efficiency. The user can then select the route not only based on fastest arrival time but one that would optimize fuel efficiency as well.

Figure 2:
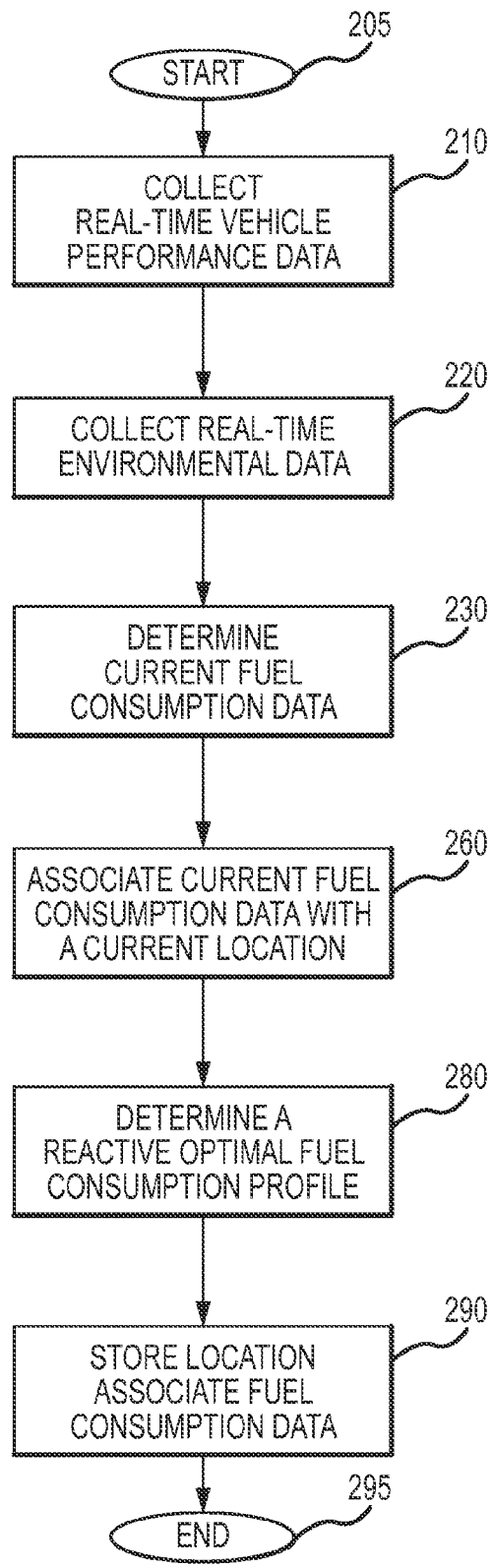
FIG. 2 is a flowchart for one method embodiment for the determination of a reactive optimal fuel consumption profile according to the present invention.

FIG. 2 is one method embodiment for vehicle management by which the reactive adaptation module can arrive at an optimal fuel consumption profile. The determination of a reactive optimal fuel consumption speed begins 205 with a collection of real-time vehicular performance data 210. In addition to collecting native vehicular data, the present invention collects real-time environmental data 220. This data may include things such as temperature, barometric pressure, relative humidity, relative wind, and the like. Data with respect to the current fuel consumption is obtained based on the current engine performance 230. The current fuel consumption is associated with the current location as provided by a global positioning system or similar positional data. Based on the collected vehicular data and environmental data, a reactive optimal fuel consumption profile 280 is produced.

Figure 3:
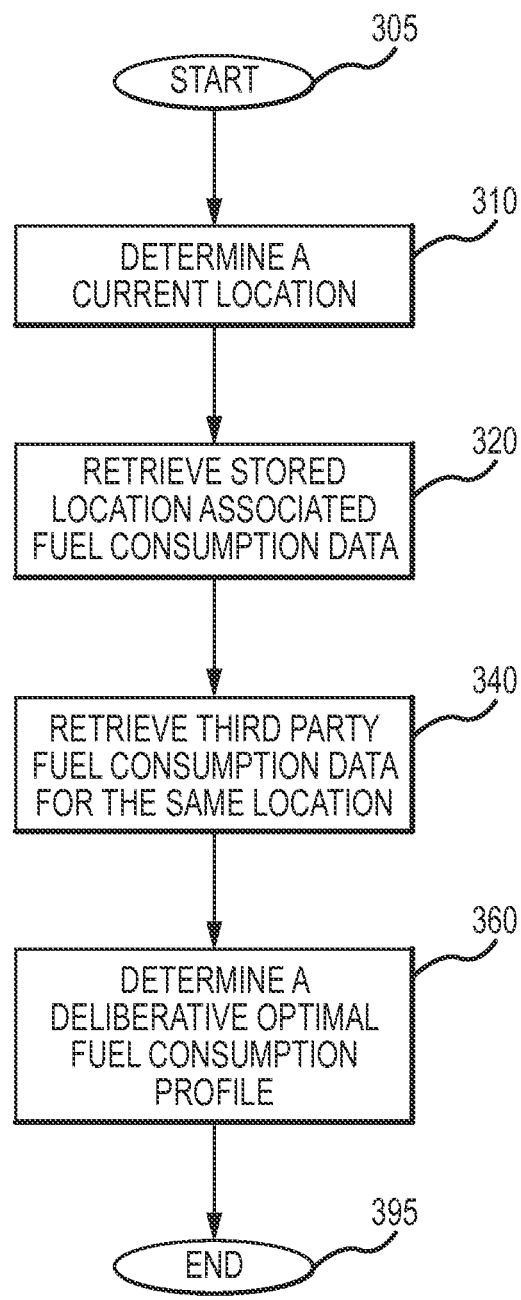
FIG. 3 is a flowchart for one method embodiment for the determination of a deliberative optimal fuel consumption profile according to the present invention.

Simultaneously, and as shown in FIG. 3, the deliberative policy module 130 determines a deliberative optimal fuel consumption profile by using historical data associated with the current location of the vehicle. The process begins 305 with the determination of the vehicle's current position 310. Based on that position, historical data regarding fuel consumption is retrieved from memory 320. Optionally, third-party data regarding fuel consumption also associated with the same position is retrieved and locally stored 340. Based on the retrieved historical data from both the internal memory system of the vehicle and from historical data collected from third parties, a deliberative optimal fuel consumption profile for a particular location is determined 360.

Figure 4:
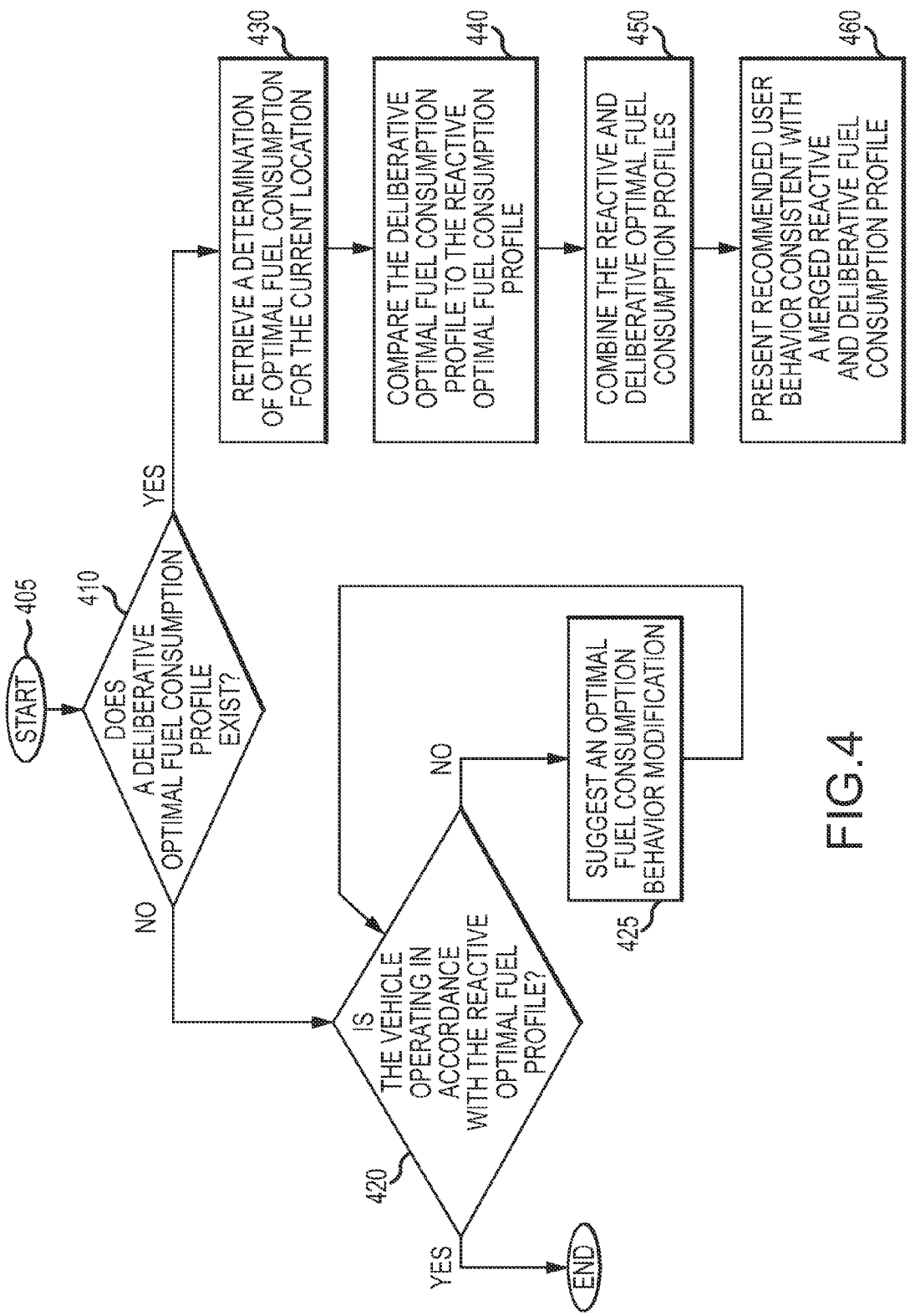
FIG. 4 is a flowchart for one method embodiment to combine a reactive optimal fuel consumption profile and a deliberative optimal fuel consumption profile so as to determine an optimal fuel consumption recommendation.

The reactive optimal fuel consumption profile and deliberative optimal fuel consumption profile are combined by process shown, in one embodiment, in FIG. 4. Such a process begins 405 with the determination of whether sufficient data exists to create a deliberative fuel consumption profile 410 and whether the vehicle is currently performing at optimal fuel efficiency 420 according to the reactive optimal fuel consumption profile. In no deliberative policy is available and the vehicle is substantially operating at its optimal fuel efficiency the process ends 495. If, however, the determination is made that the vehicle is traveling at a speed other than that which optimal fuel consumption can be achieved, system suggests 425 behavioral changes consistent with the optimal fuel consumption profile developed by the reactive module. (note this is in the instance in which there is insufficient data to develop a deliberative policy profile)

If a deliberative fuel consumption profile exists, it is retrieved 430 as is the reactive optimal fuel consumption profile and they are compared 440 to determine if based on the deliberative profile the reactive recommendation can be further modified. The reactive optimal fuel consumption profile and the deliberative optimal fuel consumption profile are combined 450. In situations in which a significant amount of historical data is available and the deliberative profile substantially differs from the reactive profile, the deliberative fuel consumption profile and the reactive fuel consumption profile are combined 450 to produce a recommended optimal fuel consumption profile. Alternatively, in situations in which historical data is lacking or is possesses questionable relevance based on current conditions, the reactive fuel consumption profile can be favored. For example, while deliberative fuel consumption profile may exist and may be associated with conditions which are not consistent with those being experienced by the current vehicle. Conditions such as the gross weight of the vehicle, vehicle configuration, road conditions, and other real-time factors may diminish the importance of deliberative fuel consumption profile. Once produced, the recommended optimal fuel consumption profile is presented 460 to the user to initiate behavior modifications.

Another aspect of the present invention is to associate the movement of two or more vehicles that are proximal to each other and traveling in the same direction or on the same route so as to produce optimal fuel consumption for each vehicle. A convoy handler module (not shown) enables two or more vehicles to travel along the same route and operate as a collaborative unit so as to optimize combined fuel consumption. According to one embodiment of the present invention vehicles can use active position tags in order to directly perceive and respond to the local world around them including people, other vehicles and infrastructure. By communicating various parameters including each determined reactive and deliberative optimal speed profiles between vehicles and data with respect to the movement of the entire convoy each vehicle can provide recommendations to each user as how to optimally react and control their individual vehicle. Accordingly, information such as convoy and vehicle speed, gear selection, fuel use, and the like can be transmitted among the vehicles so as to preclude accordion like behavior which is detrimental to fuel efficiency. Moreover tags identifying key environmental features can identify hazards or markers for guide follow-on vehicles as well as markers for vehicles to follow a specific path or initiate certain actions along a route. In one embodiment of the present invention each vehicle in a convey can be equipped with ultra wide band "UWB" frequency tag or similar technology which not only identifies which local vehicles are in a particular convey but enable a more robust and reliable communication of both inter-vehicle and infrastructure information. The information conveyed between vehicles can be used to develop a spatial understanding and relative positioning that can have synergistic effects with respect to pace, range, speed and other factors that can affect aggregate fuel consumption and mission objectives. This communication can be used to coordinate activities and behaviors.

For example, information conveyed in a designated convey can indicate that while fuel efficiency would be increased for 3 of 5 vehicles by increasing speed 10 mph, the result would dramatically reduce the efficiency of the remaining two vehicles. A more efficient aggregate speed, while not optimal for any one vehicle, may nonetheless result in a lower overall consumption of fuel. In one embodiment of the present invention both inter-vehicle and infrastructure data can be communicated via UWB communications. UWB communications transmit in a manner that does not interfere with conventional narrow band and carrier wave used in the same frequency band. UWB communications spread information over a large band (>500 MHz) enabling the spectrum to be shared. UWB transmissions transmit information by generating radio energy at specific time intervals occupying a large bandwidth to enable pulse-position or time modulation. As a result data can be conveyed in the interior of building or even underground. For example UWB transmissions can provide real-time position-based analysis in a distributed fashion using parallelism inherent to a decentralized approach. In other words, in a centralized positioning scheme the parallelism cannot be in real time whereas in the implementation of the present invention, parallel computation and analysis occurs simultaneously in each node because the UWB allows each node to position itself in reference to its nearest neighbors.

In other embodiments of the present invention, the reactive and the deliberative modules can be linked to real-time traffic control modules to optimize speed so as to match certain regulatory and certain traffic control signals that minimize stop and go operation and therefore optimize fuel efficiency. Such information can be used to modulate the speed by the operator and ensure that the vehicle reaches each stoplight with sufficient time so as to proceed without stopping. In other embodiments of the present invention the tags can be used to create specific paths for snow plows, detecting and marking landmines and IEDs, marking a safe lane through hazards, marking stretches of road or specific areas for inspection or construction, allowing harvesting/spraying vehicles to efficiently cover a field, marking a follow route in a special operations combat scenario (i.e. pathfinder), or even used in water for marking lanes for boats and ships. In yet another embodiment of the present invention a lead vehicle can identify a route or area by placing down guidance pucks that can be seen digitally by follow-on vehicles. The follow-on vehicles can be either right behind the lead vehicle or can follow days later (the duration depends on the way in which the guidance pucks are powered). Moreover the route can be digitally offset from the markers. Thus the guidance puck does not have to be placed directly on the hazard or lane boundary. Rather, an x, y, z position offset can be communicated as part of the active message strong communicated by the tag. This obviates the need for precise tag placement by the lead vehicle.

The present invention focuses on the determination of optimal performance based on internal vehicle performance, external environmental characteristics and historical positional data. By collaboratively combining native data with respect to a vehicle, external and environmental data and positional data, a speed at which to achieve optimal fuel efficiency can be recommended to the user. Moreover, the present invention can utilize recorded behavioral characteristics and fuzzy logic to provide a recommendation to the user that needs user characteristics while still optimizing fuel consumption. The invention described herein enables vehicle operators to modify their behaviors to optimize efficiency by communicating insights regarding optimal speed, gear selection, acceleration/deceleration, alternative routes, and the like. These modifications in behavior can be based on previously laid down markers that can send messages directly to other vehicles identifying a specific path or route or action. Alternatively a tag can specify an offset so that the marker does not have to be placed directly on a hazard or lane boundary. Using wide band technology the placement of these markers can be perceived over long distances and via non-line-of-sight topologies. Accordingly the tags can be useful to guide vehicles through rain, snow, dust, fog and thick vegetation and in areas that are denied the use of global positioning satellite technology. These insights are based on the analysis of a wide range of factors that individually and collectively affect performance. While the invention described herein is applicable to the consumption of fossil fuels and the management of vehicular movement, it can be equally applied to the consumption of electricity or vehicles possessing hybrid technology. For example, it may be more optimal to utilize battery resources for electrical vehicles to climb a hill and then regenerate the battery during braking descents, as opposed to charging the battery using an engine during an ascent and wasting braking energy during descent.

Figure 5:
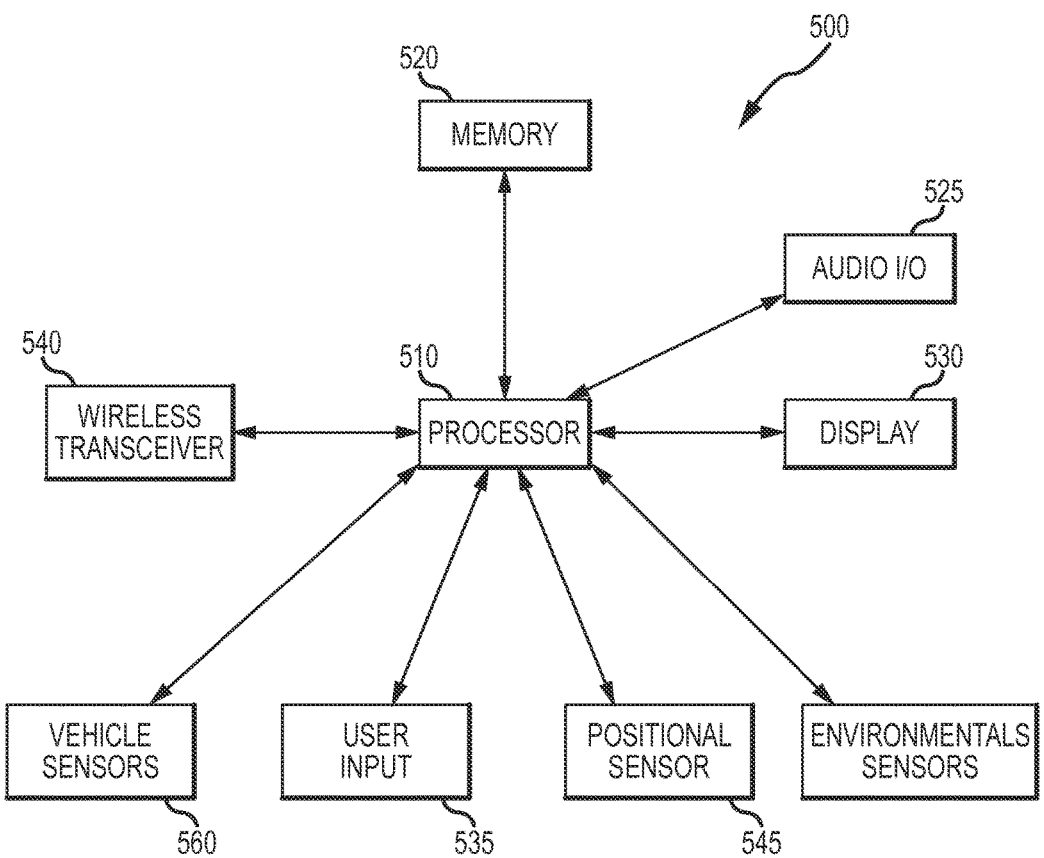
FIG. 5 is a high level rendition of a processing environment suitable for operations of the present invention.

FIG. 5 is a high level representation of a data processing system that may be used with one embodiment of the present invention. For example, system 500 may be implemented as part of the system shown in FIG. 1. The data processing system 500 includes a processing system 510, which may be one or more microprocessors, or which may be a system on a chip integrated circuit, and the system also includes memory 520 for storing data and programs for execution by the processing system. The system 500 also includes an audio input/output subsystem 525 which may include a microphone and a speaker, for example, playing back music or providing feedback through the speaker and microphone.

A display controller and display device 530 provide a visual user interface for the user; this digital interface may include a graphical user interface which is similar to that shown on performance gauges of current vehicles. The system 500 also includes one or more wireless transceivers 540 to communicate with another data processing system and a positional sensor 545 by which to identify its position globally. The wireless transceiver may be a WiFi transceiver, a generic transceiver, an infrared transceiver, a Bluetooth transceiver, a wireless cellular telephone transceiver and/or the like. It will be appreciated that additional components, not shown, may also be part of the system 500 in certain embodiments, and in certain embodiments fewer components than shown in FIG. 5 may also be used in a data processing system.

The data processing system 500 also includes one or more input devices 535 which are provided to allow a user to provide input to the system. These input devices may be a keypad or a keyboard, button, a touch panel or a multi touch panel. The data processing system 500 also includes an optional input/output device which may facilitate a hard-wired computer-to-computer connection. In addition, the system 500 includes systems operable to detect and collect data 560 regarding native and environmental conditions. It will also be appreciated that one or more buses, not shown, may be used to interconnect the various components, as is well known in the art. The data processing system shown in FIG. 5 may be a handheld computer, or a manipulable user interface, or a personal digital assistant (PDA), or a cellular telephone with PDA like functionality, or a handheld computer which includes a communication capability, or a media player, such as an iPod, or devices which combine aspects or functions of these devices, such as a media player combined with a PDA and a cellular telephone in one device. In other embodiments, the data processing system 500 may be a personal computer or an embedded processing device within another device, or other types of data processing systems such as a base station which have fewer components or perhaps more components than that shown in FIG. 5.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

While there have been described above the principles of the present invention in conjunction with a system by which to optimize vehicular fuel consumption, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed, either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A method for coordinated movement of a vehicle, the method comprising:
   collecting real time vehicular and environmental data from a plurality of sensors;
   determining a location for the vehicle within an environment based on data collected from the plurality of sensors;
   determining a relative location for the vehicle relative to one or more other proximal vehicles based on data collected from the plurality of sensors;
   communicating the relative location and the location of the vehicle among the one or more other proximal vehicles;
   receiving position data from the plurality of sensors;
   determining a vehicle path based on position data from the plurality of sensors, the location of the vehicle, and the relative location of the vehicle from the one or more other proximal vehicles; and
   determining a vehicle speed based on the location of the vehicle along the vehicle path, the relative location of the vehicle from the one or more other proximal vehicles and operation as a collaborative unit wherein the vehicle speed based on operation as a collaborative unit is an aggregate optimal speed for the one or more other proximal vehicles.

2. The method of claim 1 wherein the plurality of sensors are associated with the vehicle.

3. The method of claim 1 wherein the plurality of sensors are associated with the environment along the vehicle path.

4. The method of claim 3 wherein the plurality of sensors associated with the environment is proximal to the vehicle.

5. The method of claim 1 wherein determining the vehicle path includes collaborating with the one or more other proximal vehicles to identify an optimal route and optimal speed.

6. The method of claim 1 where the vehicle path is a collective path shared by the one or more other proximal vehicles.

7. A method for coordinated movement of a vehicle, the method comprising:
   collecting real time vehicular and environmental data from a plurality of sensors;
   determining a location for the vehicle within an environment based on data collected from the plurality of sensors;
   determining a relative location for the vehicle relative to one or more other proximal vehicles based on data collected from the plurality of sensors;
   communicating the relative location and the location of the vehicle among the one or more other proximal vehicles wherein communicating includes using ultra-wide band technology to communicate data among the one or more other proximal vehicles and wherein determining a relative location for the vehicle relative to one or more other proximal vehicles occurs simultaneously and in parallel by each of the plurality of vehicles;
   receiving position data from the plurality of sensors; and
   determining a vehicle path based on information data from the plurality of sensors, the location of the vehicle, and the relative location of the vehicle from the one or more other proximal vehicles.

8. A non-transitory computer-readable storage medium tangibly embodying a program of instructions executable by a processor wherein said program of instructions comprises a plurality of program codes for coordinated movement of a vehicle, said program of instructions comprising:
   program code for collecting real time vehicular and environmental data from a plurality of sensors;
   program code for determining a location for the vehicle within an environment based on data collected from the plurality of sensors;
   program code for determining a relative location for the vehicle relative to one or more other proximal vehicles based on data collected from the plurality of sensors;

program code for communicating the relative location and the location of the vehicle among the one or more other proximal vehicles;

program code for receiving position data from the plurality of sensors; and program code for determining a vehicle path based on position data from the plurality of sensors, the location of the vehicle, and the relative location of the vehicle from the one or more other proximal vehicles, and collaborating with the one or more other proximal vehicles to identify an optimal route and optimal speed.

9. The program of instructions embodied on the non-transitory computer-readable storage medium of claim 8 further compromising program code for determining a vehicle speed based on the location of the vehicle along the path, the relative location of the vehicle from the one or more other proximal vehicles and operation as a collaborative unit.

10. The program of instructions embodied on the non-transitory computer-readable storage medium of claim 9 wherein the vehicle speed based on operation as a collaborative unit is an aggregate optimal speed for the one or more other proximal vehicles.

11. A non-transitory computer-readable storage medium tangibly embodying a program of instructions executable by a processor wherein said program of instructions comprises a plurality of program codes for coordinated movement of a vehicle, said program of instructions comprising:

program code for collecting real time vehicular and environmental data from a plurality of sensors;

program code for determining a location for the vehicle within an environment based on data collected from the plurality of sensors;

program code for determining a relative location for the vehicle relative to one or more other proximal vehicles, simultaneously and in parallel by each of the plurality of vehicles, based on data collected from the plurality of sensors;

program code for communicating the relative location and the location of the vehicle among the one or more other proximal vehicles;

program code for receiving position data from the plurality of sensors; and program code for determining a vehicle path based on position data from the plurality of sensors, the location of the vehicle, and the relative location of the vehicle from the one or more other proximal vehicles.

* * * * *